US009643509B2

(12) United States Patent
Bang (10) Patent No.: US 9,643,509 B2
(45) Date of Patent: May 9, 2017

(54) APPARATUS AND METHOD FOR PROVIDING MULTI-VOLTAGE OUTPUT OF LOW VOLTAGE DC-DC CONVERTER OF ECO-FRIENDLY VEHICLE

(71) Applicant: HYUNDAI MOBIS CO., LTD., Seoul (KR)

(72) Inventor: Hyo-Jin Bang, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 521 days.

(21) Appl. No.: 14/249,277

(22) Filed: Apr. 9, 2014

(65) Prior Publication Data

US 2015/0183334 A1 Jul. 2, 2015

(30) Foreign Application Priority Data

Dec. 26, 2013 (KR) .................. 10-2013-0163696

(51) Int. Cl.
| | |
|---|---|
| *B60L 11/18* | (2006.01) |
| *B60R 16/033* | (2006.01) |
| *H02M 3/24* | (2006.01) |
| *H02M 3/335* | (2006.01) |
| *H02M 1/00* | (2006.01) |

(52) U.S. Cl.
CPC ....... *B60L 11/1861* (2013.01); *B60L 11/1805* (2013.01); *B60R 16/033* (2013.01); *H02M 3/24* (2013.01); *H02M 3/3353* (2013.01); *H02M 2001/007* (2013.01); *H02M 2001/008* (2013.01)

(58) Field of Classification Search
CPC .. B60L 11/18; B60L 11/1805; B60L 11/1851; B60L 11/1861; B60L 2210/10; B60R 16/03; B60R 16/033; H02M 1/42; H02M 3/22; H02M 3/24; H02M 2001/007; H02M 2001/008
USPC ................................ 307/9.1, 10.1
See application file for complete search history.

(56) References Cited

U.S. PATENT DOCUMENTS

| | | | |
|---|---|---|---|
| 6,195,275 B1 | 2/2001 | Lu | |
| 6,323,608 B1 * | 11/2001 | Ozawa | B60K 6/28 318/139 |

(Continued)

FOREIGN PATENT DOCUMENTS

| | | |
|---|---|---|
| CN | 102377331 A | 3/2012 |
| JP | 2009-278847 A | 11/2009 |

(Continued)

*Primary Examiner* — Levi Gannon
(74) *Attorney, Agent, or Firm* — Knobbe, Martens Olson & Bear LLP (57) ABSTRACT

An apparatus for providing a multi-voltage output of a low voltage DC-DC converter of an eco-friendly vehicle may include a transformer converting AC power of the high voltage into AC power of a first voltage, a rectifying unit generating the AC power of the first voltage as DC power of a first voltage, a first voltage output unit supplying the first voltage to a first electric field load of the eco-friendly vehicle from the DC power of the first voltage, a converter converting the DC power of the first voltage into DC power of a second voltage having a voltage value different from the first voltage, and a second voltage output unit supplying the second voltage from the DC power of the second voltage to a second electric field load.

17 Claims, 4 Drawing Sheets

(56) References Cited

U.S. PATENT DOCUMENTS

| | | | |
|---|---|---|---|
| 7,917,276 B2* | 3/2011 | Senda | H02J 7/1438 290/40 B |
| 2004/0100241 A1* | 5/2004 | Abo | B60L 11/1851 323/284 |
| 2005/0151517 A1* | 7/2005 | Cook | B60R 16/03 323/207 |
| 2010/0141213 A1* | 6/2010 | Iida | B60L 1/00 320/134 |
| 2012/0049794 A1* | 3/2012 | Han | B60L 1/003 320/109 |
| 2012/0153907 A1 | 6/2012 | Carobolante et al. | |
| 2013/0334879 A1 | 12/2013 | Ido et al. | |
| 2016/0001719 A1* | 1/2016 | Frost | B60L 11/1868 307/10.1 |

FOREIGN PATENT DOCUMENTS

| | | |
|---|---|---|
| KR | 10-2007-0039077 A | 4/2007 |
| KR | 10-2013-0063893 A | 6/2013 |
| KR | 10-2013-0082360 A | 7/2013 |

* cited by examiner

FIG.3

APPARATUS AND METHOD FOR PROVIDING MULTI-VOLTAGE OUTPUT OF LOW VOLTAGE DC-DC CONVERTER OF ECO-FRIENDLY VEHICLE

CROSS-REFERENCE TO RELATED APPLICATION

This application claims the benefit of priority to Korean Patent Application No. 10-2013-0163696 filed on Dec. 26, 2013, the entire contents of which are incorporated herein by reference.

TECHNICAL FIELD

Exemplary embodiments of the present invention relates to a low voltage DC-DC converter of an eco-friendly vehicle, particularly, to an apparatus and a method for providing a multi-voltage output of a low voltage DC-DC converter of an eco-friendly vehicle.

BACKGROUND

Generally, to cope with a danger of air pollution and petroleum depletion, related technologies for an eco-friendly vehicle using electric energy as power of the vehicle has been actively developed. The eco-friendly vehicle includes a hybrid electric vehicle, a fuel cell electric vehicle, and an electric vehicle.

The eco-friendly vehicle includes a high voltage battery for driving the vehicle and a low voltage battery for driving an electric sub assembly or an electronic sub assembly. The electric energy charged in the high voltage battery is used as a power source for the vehicle and the electric energy charged in the low voltage battery is used as power for the electric sub assembly or the electronic sub assembly (ESA) of the vehicle.

Meanwhile, a plurality of electric sub assemblies or electronic sub assemblies mounted in the eco-friendly vehicle may include combined parts of substrates configured of elements, such as electrical parts, electronic parts and resistors or capacitors, which are supplied with power from a battery for the vehicle, with mechanical tools. To meet a development of a vehicle-related technology and needs of a driver, the number of electric sub assemblies or electronic sub assemblies mounted in the vehicle tends to increase and a magnitude of voltage required as power in each of the electric sub assemblies or electronic sub assemblies has gradually diversified.

A vehicle in accordance with the related art includes a plurality of low voltage battery power converters to provide power required for various types of electric sub assemblies or electronic sub assemblies, thereby outputting voltages corresponding to each power supply for the electric sub assemblies or the electronic sub assemblies.

Figure 1:
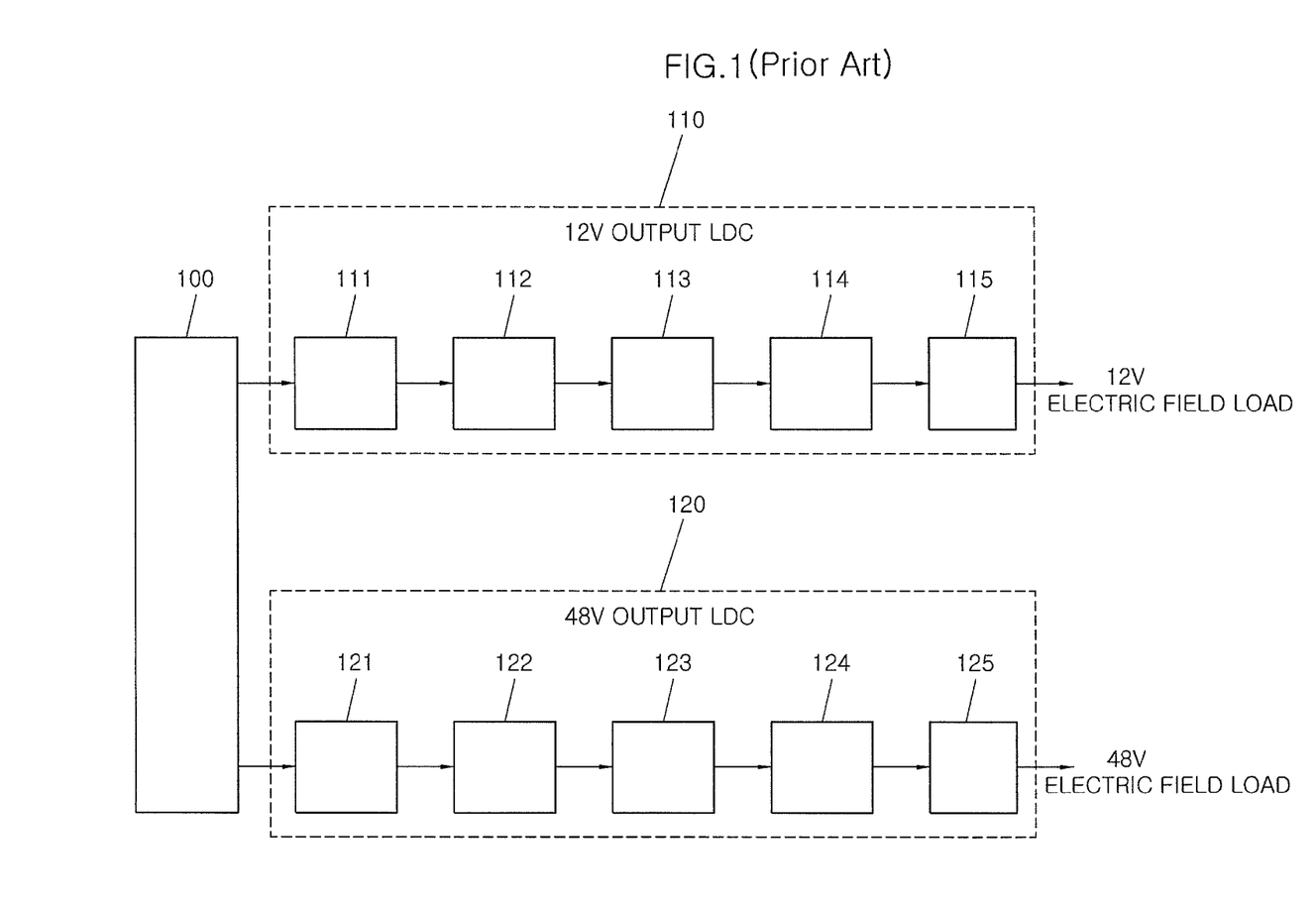
FIG. 1 is a block diagram illustrating a plurality of low voltage DC-DC converter of an eco-friendly vehicle in accordance with the related art.

FIG. 1 is a block diagram illustrating a plurality of low voltage DC-DC converter of the vehicle in accordance with the related art. Referring to FIG. 1, a plurality of low voltage DC-DC converters 110 and 210 of an eco-friendly vehicle in accordance with the related art each include a 12V output low voltage DC-DC converter 110 and a 48V output low voltage DC-DC converter 120 for outputting a first voltage (for example, 48V) and a second voltage (for example, 12V) which are voltages required in a plurality of electric sub assemblies or electronic sub assemblies mounted in a vehicle.

The 12V output low voltage DC-DC converter 110 is supplied with DC power of a high voltage from the high voltage battery 100 mounted in the eco-friendly vehicle and reduces the supplied DC power of the high voltage to be converted into DC power of a 12V low voltage, thereby supplying the DC power of the 12V low voltage as power for the electric sub assembly using 12V and power for charging the low voltage battery. The high voltage battery 100 includes a plurality of battery cells formed therein and outputs power of a high voltage of several hundred volts such as about 270V or higher as a total output voltage of each of the battery cells.

The 12V output low voltage DC-DC converter 110 includes an AC voltage converting unit 111, a transformer 112, a rectifying unit 113, an LC filter unit 114, and a 12V output unit 115.

The AC voltage converting unit 111 is supplied with DC power of a high voltage from the high voltage battery and converts the supplied DC power of the high voltage into AC power of a high voltage having a desired pulse width by a full bridge type of pulse width modulation (PWM).

The transformer 112 performs insulating and stepping-down functions. The AC power of the high voltage input from the AC voltage converting unit 111 is transferred from a primary side coil to a secondary side coil, in which the primary side coil and the secondary side coil are mounted in the transformer 112 and are insulated from each other. Further, the AC power of the high voltage input from the AC voltage converting unit 111 is reduced to the AC power of the 12V low voltage depending on a turn ratio of the transformer 112.

The rectifying unit 113 again converts 12V AC power input from the transformer 112 into 12V DC power by an operation of a plurality of mounted rectifying diodes.

Since the 12V DC power input from the rectifying unit 113 has a pulse width converted by the AC voltage converting unit 111, the LC filter unit 114 removes a ripple by an operation of the mounted LC filter to convert the 12V DC power into 12V DC power in a smooth state, not a pulse type.

The 12V output unit 115 is supplied with the 12V DC power in the smooth state from the LC filter unit 114 to be provided as power for charging a plurality of electric sub assemblies or electronic sub assemblies using the 12V DC power and a low voltage battery.

In components which configure the 48V output low voltage DC-DC converter 120, functions of an AC voltage converting unit 121, a rectifying unit 123, and an LC filter unit 124 which are the rest components other than the components configuring the 48V output low voltage DC-DC converter 110 and a transformer 122 and a first voltage (48V) output unit 125 are the same as those of the AC voltage converting unit 111, the rectifying unit 113, and the LC filter unit 114. Therefore, the detailed description of the components performing the same functions is omitted and the transformer 122 and the 48V output unit 125 which are different components will be described in detail.

The 48V output low voltage DC-DC converter 120 includes the AC voltage converting unit 121, the transformer 122, the rectifying unit 123, the LC filter unit 124, and the first voltage (48V) output unit 125.

The transformer 122 performs insulating and stepping-down functions. The AC power of the high voltage input from the AC voltage converting unit 121 is transferred from a primary side coil to a secondary side coil, in which the primary side coil and the secondary side coil are mounted in the transformer 122 and are insulated from each other.

Further, the AC power of the high voltage input from the AC voltage converting unit 111 is reduced to the AC power of the 48V low voltage depending on a turn ratio of the transformer 112.

The 48V output unit 125 is supplied with the 48V DC power in the smooth state from the LC filter unit 124 and provides the input 48V DC power as power for the plurality of electric sub assemblies or electronic sub assemblies which use the 48V DC power.

Meanwhile, due to the increase in an electric field load of the eco-friendly vehicle, a capacity of the 12V output low voltage DC converter 110 is continuously increased. The increase in the 12V electric field load means the increase in current in the fixed voltage and a size of an electric field power cable is also increased. This adversely affects fuel efficiency, size, and performance of the eco-friendly vehicle. To solve the above problems, the electric sub assemblies or electronic sub assemblies using the 48V power have been developed and applied. However, to supply the power required for the 48V electric field load, in addition to the foregoing 12V output low voltage DC converter 110, the 48V output low voltage DC converter 120 needs to be mounted in the eco-friendly vehicle. This is a cause of increasing a size and manufacturing costs of the eco-friendly vehicle.

The plurality of low voltage power converter mounted in the vehicle occupies a predetermined space in a limited space of the vehicle and when any one of the plurality of low voltage power converters is broken, there is a need to confirm whether all the low voltage power converters mounted in the vehicle are broken. Therefore, a need exists for a technology of a voltage-power converter which may provide a multi-voltage output to be able to provide different power required for the electric sub assemblies or the electronic sub assemblies of the vehicle.

SUMMARY

An embodiment of the present invention is directed to an apparatus and a method for providing a multi-voltage output of a low voltage DC-DC converter of an eco-friendly vehicle capable of providing different power required for a plurality of electric sub assemblies or electronic sub assemblies mounted in the eco-friendly vehicle.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, an apparatus for providing a multi-voltage output of a low voltage DC-DC converter of an eco-friendly vehicle, including: an AC voltage converting unit configured to convert DC power of a high voltage of a high voltage battery into AC power of a high voltage; a transformer configured to convert the converted AC power of the high voltage into AC power of a first voltage; a rectifying unit configured to generate the AC power of the first voltage as DC power of a first voltage; a first voltage output unit configured to supply the first voltage to a first electric field load of the eco-friendly vehicle from the DC power of the first voltage; a converter configured to convert the DC power of the first voltage into DC power of a second voltage having a voltage value different from the first voltage; and a second voltage output unit configured to supply the second voltage from the DC power of the second voltage to a second electric field load.

The eco-friendly vehicle may be at least one of a hybrid electric vehicle, a fuel cell electric vehicle, and an electric vehicle.

The first voltage may have a voltage value of 48V.

The second voltage may have a voltage value of 12V.

The converter may be a non-insulated and voltage reduced converter.

The apparatus for providing a multi-voltage output of a low voltage DC-DC converter of an eco-friendly vehicle may further include: a first power consumption calculation unit configured to calculate power consumption varying depending on an operational state of a first electric field load using the first voltage; a second power consumption calculation unit configured to calculate power consumption varying depending on an operational state of a second electric field load varying depending on at least one of the electric sub assemblies or electronic sub assemblies using the second voltage; and a control unit configured to, after receiving an ignition signal of the eco-friendly vehicle, select operation modes corresponding to the calculated power consumption of the first electric field load and the calculated power consumption of the second electric field load among pre-established operation modes, and control the output of the high voltage battery to provide the output of the overall power consumption depending on the selected operation mode.

The output of the overall power consumption may be determined as a value which is a sum of the calculated power consumption of the first electric field load and the calculated power consumption of the second electric field load.

The first power consumption calculation unit may divide a range into three stage ranges within a range of more than 0% to 100% or less to calculate the power consumption of the first electric field load.

The second power consumption calculation unit may divide a range into three stage ranges within a range of more than 0% to 100% or less to calculate the power consumption of the second electric field load.

The control unit may divide a range into six stage ranges within a range of more than 0% to 200% or less to calculate the output of the overall power consumption.

The An apparatus for providing a multi-voltage output of a low voltage DC-DC converter of an eco-friendly vehicle may further include: an LC filter unit configured to remove a ripple of the DC power of the first voltage by an operation of an LC filter and convert the DC power of the first voltage into DC power of the first voltage in a smooth state.

The conversion into the AC power of the high voltage may be performed using a full bridge type of pulse width modulation.

The rectifying unit may be configured of a plurality of rectifying diodes.

In accordance with another embodiment of the present invention, a method for providing a multi-voltage output of a low voltage DC-DC converter of an eco-friendly vehicle, including: receiving an ignition signal of an eco-friendly vehicle; supplying a first voltage to a first electric field load and supplying a second voltage to a second electric field; monitoring and calculating power consumption of the first electric field lead and power consumption of the second electric field; selecting operation modes corresponding to the calculated power consumption of the first electric field lead and the calculated power consumption of the second electric field among pre-established operation modes controlling an output of a high voltage battery mounted in the eco-friendly vehicle; and controlling the output of the high voltage battery depending on the selected operation mode to provide the output of the overall power consumption.

DETAILED DESCRIPTION

Hereinafter, exemplary embodiments of the present invention will be described in detail with reference to the accompanying drawings. However, the present invention will be not limited or restricted to the embodiments below. Like reference numerals proposed in each drawing denote like components.

Terms used in the specification, 'first', 'second', etc. can be used to describe various components, but the components are not to be construed as being limited to the terms. That is, the terms are used to distinguish one component from another component. For example, the 'first' component may be named the 'second' component and the 'second' component may also be similarly named the 'first' component, without departing from the scope of the present invention. Terms used in the present specification are used only in order to describe specific exemplary embodiments rather than limiting the present invention. Singular forms are intended to include plural forms unless the context clearly indicates otherwise.

Further, the terminologies used in the present invention are selected as general terminologies currently widely used in consideration of the configuration and functions of the present invention, but may be different depending on intention of those skilled in the art, a precedent, appearance of new technologies, and the like. Further, in specific cases, terms arbitrarily selected by an applicant are present. In this case, the detailed meaning of the terms will be described in the description of the present invention. Therefore, terms used in the present invention are defined based on a meaning of the terms and contents described in the present invention, not simply based on names of the terms.

Throughout the present specification, unless explicitly described to the contrary, "comprising" any components will be understood to imply the inclusion of other elements rather than the exclusion of any other elements. A term "unit", "module" or the like, described in the specification means a unit of processing at least one function or operation and may be implemented by hardware or software or a combination of hardware and software.

Hereinafter, to help understand the apparatus and the method for providing a multi-voltage output of a low voltage DC-DC converter of an eco-friendly vehicle in accordance with the embodiment of the present invention, terms are defined as follows.

The eco-friendly vehicle in accordance with the embodiment of the present invention includes at least one of a hybrid electric vehicle, a fuel cell electric vehicle, and an electric vehicle.

The control unit in accordance with the embodiment of the present invention is an electronic control unit (ECU) mounted in the vehicle and may include an electronic control device which is mounted in the apparatus for providing a multi-voltage output of a low-voltage DC-DC converter of an eco-friendly vehicle in accordance with the embodiment of the present invention and an electronic control device of another system which is included in a vehicle. For example, the control unit may be an electronic control device of a battery management system (BMS) which is mounted in the vehicle.

Further, the control unit in accordance with the embodiment of the present invention may control the output of the high voltage battery which is mounted in the vehicle. For example, the control unit controls a conducting operation or a short-circuit operation between a plurality of battery cells configuring the high voltage battery, thereby finally controlling power output from an output terminal of the high voltage battery.

The low voltage DC-DC converter of the eco-friendly vehicle in accordance with the embodiment of the present invention will be described with reference to the accompanying drawings.

Figure 2:
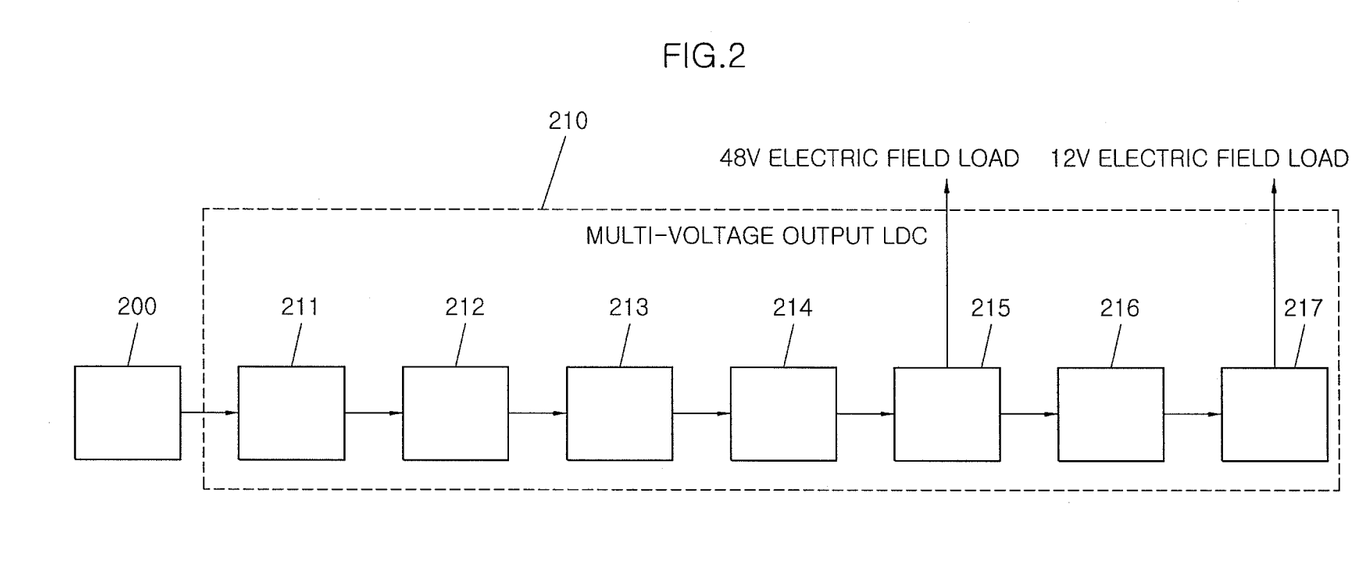
FIG. 2 is a block diagram illustrating an apparatus for providing a multi-voltage output of a low voltage DC-DC converter of an eco-friendly vehicle in accordance with an embodiment of the present invention.

FIG. 2 is a block diagram illustrating an apparatus for providing a multi-voltage output of a low voltage DC-DC converter of an eco-friendly vehicle in accordance with an embodiment of the present invention. Referring to FIG. 2, an apparatus 210 for providing a multi-voltage output of a low voltage DC-DC converter of an eco-friendly vehicle in accordance with an embodiment of the present invention may output a first voltage (for example, 48V) which may be used to propel the vehicle and a second voltage (for example, 12V) which are required for a plurality of electric sub assemblies or electronic sub assemblies mounted in the vehicle.

The apparatus 210 for providing a multi-voltage output of a low voltage DC-DC converter of an eco-friendly vehicle in accordance with the embodiment of the present invention is supplied with DC power of a high voltage from a high voltage battery 200 mounted in the eco-friendly vehicle and reduces the supplied DC power of the high voltage to be converted into the DC power of the 48V and 12V low voltage, thereby supplying the DC power of the 48V and 12V low voltage as power for the electric sub assembly using 48V or 12V and power for charging the low voltage battery. The high voltage battery 200 includes a plurality of battery cells formed therein and may output power of a high voltage of several hundred volts such as about 270V or higher as a total output voltage of each of the battery cells.

The apparatus 210 for providing a multi-voltage output of a low voltage DC-DC converter of an eco-friendly vehicle may include an AC voltage converting unit 211, a transformer 212, a rectifying unit 213, an LC filter unit 214, a first voltage (48V) output unit 215, a converter 216, and a second voltage (12V) output unit 217.

The AC voltage converting unit 211 is supplied with the high DC power from the high voltage battery and converts the supplied DC power of the high voltage into AC power of a high voltage having a desired pulse width by a full bridge type of pulse width modulation (PWM).

The transformer 212 performs insulating and stepping-down functions. The AC power of the high voltage input from the AC voltage converting unit 211 is transferred from a primary side coil to a secondary side coil, in which the primary side coil and the secondary side coil are mounted in the transformer 212 and are insulated from each other. Further, the AC power of the high voltage input from the AC voltage converting unit 211 is reduced to the AC power of the 48V low voltage depending on a turn ratio of the transformer 212.

The rectifying unit 213 again converts 48V AC power input from the transformer 212 into 48V DC power by an operation of a plurality of mounted rectifying diodes.

Since the 48V DC power input from the rectifying unit 213 has a pulse width converted by the AC voltage converting unit 211, the LC filter unit 214 removes a ripple by an operation of the mounted LC filter to convert the 48V DC power into 48V DC power in a smooth state, not a pulse type.

The first voltage (48V) output unit 215 is supplied with the 48V DC power in the smooth state from the LC filter unit 214 and provides the input 48V DC power as power for the plurality of electric sub assemblies or electronic sub assemblies which use the 48V DC power.

The converter 216 is a non-insulated and voltage reduced converter and may be supplied with the 48V DC power in the smooth state from the first voltage (48V) output unit 215 and reduce the supplied 48V DC power to the 12V DC power.

The second voltage (12V) output unit 217 is supplied with the 12V DC power in the smooth state from the converter 216 to be provided as power for charging the plurality of electric sub assemblies or electronic sub assemblies using the 12V DC power and the low voltage battery.

Figure 3:
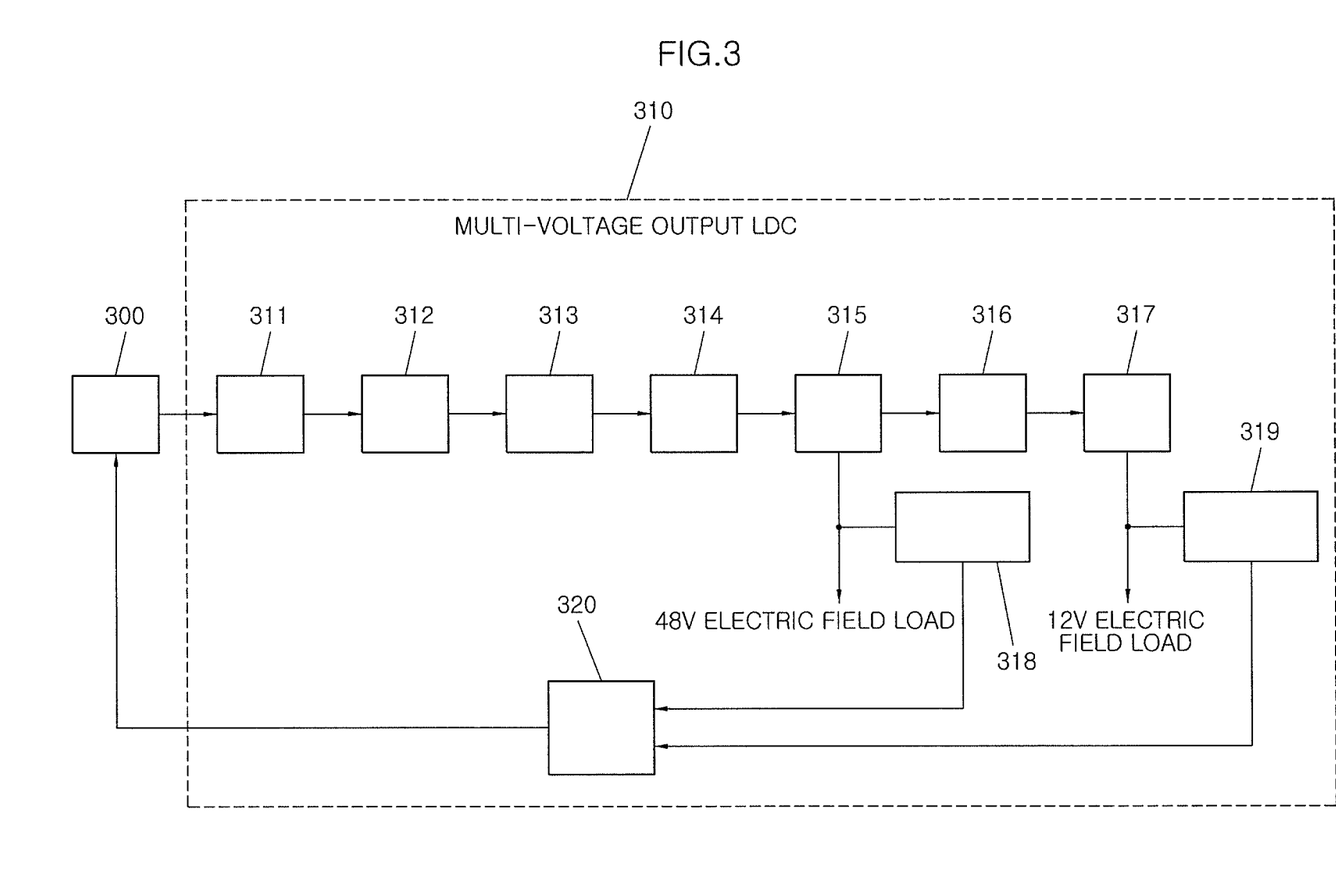
FIG. 3 is a block diagram illustrating an apparatus for providing a multi-voltage output of a low voltage DC-DC converter of an eco-friendly vehicle in accordance with another embodiment of the present invention.

FIG. 3 is a block diagram illustrating an apparatus for providing a multi-voltage output of a low voltage DC-DC converter of an eco-friendly vehicle in accordance with another embodiment of the present invention. Referring to FIG. 3, an apparatus 310 for providing a multi-voltage output of a low voltage DC-DC converter of an eco-friendly vehicle in accordance with an embodiment of the present invention may output a first voltage (for example, 48V) and a second voltage (for example, 12V) which are required for a plurality of electric sub assemblies or electronic sub assemblies mounted in the vehicle.

An apparatus 310 for providing a multi-voltage output of a low voltage DC-DC converter of an eco-friendly vehicle in accordance with another embodiment of the present invention is supplied with DC power of a high voltage from a high voltage battery 300 mounted in the eco-friendly vehicle and reduces the supplied DC power of the high voltage to be converted into the DC power of the 48V and 12V low voltage, thereby supplying the DC power of the 48V and 12V low voltage as power for the electric sub assembly using 48V or 12V and power for charging the low voltage battery. The high voltage battery 300 includes a plurality of battery cells formed therein and may output power of a high voltage of several hundred volts such as about 270V or higher as a total output voltage of each of the battery cells.

In components which configure the apparatus 310 for providing a multi-voltage output of a low voltage DC-DC converter of an eco-friendly vehicle, functions of an AC voltage converting unit 311, a transformer 312, a rectifying unit 313, an LC filter unit 314, a first voltage (48V) output unit 315, a converter 316, a second voltage (12V) output unit 317 which are the rest components other than the components configuring the apparatus 210 for providing a multi-voltage output of a low voltage DC-DC converter of an eco-friendly vehicle and a first voltage (48V) power consumption calculation unit 318, a second voltage (12V) power consumption calculation unit 319, and a control unit 320 are the same as those of the AC voltage converting unit 211, the transformer 212, the rectifying unit 213, and the LC filter unit 214, the first voltage (48V) output unit 215, the converter 216, and the second voltage (12V) output unit 217. Therefore, the detailed description of the components performing the same functions will be omitted and the first voltage (48V) power consumption calculation unit 318, the second voltage (12V) power consumption calculation unit 319, and the control unit 320 will be described in detail.

The apparatus 310 for providing a multi-voltage output of a low voltage DC-DC converter of an eco-friendly vehicle may include the AC voltage converting unit 311, the transformer 312, the rectifying unit 313, the LC filter unit 314, the first voltage (48V) output unit 315, the converter 316, the second voltage (12V) output unit 317, the first voltage (48V) power consumption calculation unit 318, the second voltage (12V) power consumption calculation unit 319, and the control unit 320.

The first voltage (48V) power consumption calculation unit 318 may include a current sensor (not illustrated) and a voltage sensor (not illustrated).

The current sensor of the first voltage (48V) power consumption calculation unit 318 may measure a current of a varying 48V electric field load and transfer a current value of the measured 48V electric field load to the first voltage (48V) power consumption calculation unit 318. The 48V electric field load may vary depending on whether the plurality of electric sub assemblies or electric sub assemblies using the 48V voltage included in the eco-friendly vehicle as power is operated.

The voltage sensor of the first voltage (48V) power consumption calculation unit 318 may measure a voltage of a varying 48V electric field load and transfer a voltage value of the measured 48V electric field load to the first voltage (48V) power consumption calculation unit 318.

The first voltage (48V) power consumption calculation unit 318 may calculate the power consumption of the 48V electric field load for the varying 48V electric field load from the measured current value and voltage value. The first voltage (48V) power consumption calculation unit 318 may transfer the calculated power consumption of the 48V electric field load to the control unit 320.

The second voltage (12V) power consumption calculation unit 319 may include the current sensor (not illustrated) and the voltage sensor (not illustrated).

The current sensor of the second voltage (12V) power consumption calculation unit 319 may measure the current of the varying 12V electric field load and transfer the current value of the measured 12V electric field load to the second voltage (12V) power consumption calculation unit 319. The 12V electric field load may vary depending on whether the plurality of electric sub assemblies or electric sub assemblies using the 12V voltage included in the eco-friendly vehicle as power is operated and whether the low voltage battery is charged.

The voltage sensor of the second voltage (12V) power consumption calculation unit 319 may measure a voltage of a varying 48V electric field load and transfer a voltage value of the measured 48V electric field load to the second voltage (12V) power consumption calculation unit 319.

The second voltage (12V) power consumption calculation unit 319 may calculate the power consumption of the 48V electric field load for the varying 12V electric field load from the measured current value and voltage value. The second voltage (12V) power consumption calculation unit 319 may transfer the calculated power consumption of the 12V electric field load to the control unit 320.

The control unit 320 may receive an ignition signal of the eco-friendly vehicle and the control the operations of each component in the apparatus 310 for providing a multi-voltage output of a low voltage DC-DC converter of an eco-friendly vehicle.

Further, the control unit 320 may control the first voltage 48V power consumption calculation unit 318 to monitor the power consumption of the 48V electric field load and calculate the power consumption of the 48V electric field load.

Further, the control unit 320 may control the second voltage 12V power consumption calculation unit 319 to monitor the power consumption of the 12V electric field load and calculate the power consumption of the 48V electric field load.

Further, the control unit 320 may receive the power consumption of the 48V electric field load calculated by the first voltage (48V) power consumption calculation unit 318 and the power consumption of the 12V electric field load calculated by the second voltage (12V) power consumption calculation unit 319 and select the operation modes corresponding to the power consumption of the received 48V electric field and the power consumption of the 12V electric field load among pre-established operation modes.

Further, the control unit 320 may receive the power consumption of the 48V electric field load calculated by the first voltage (48V) power consumption calculation unit 318 and the power consumption of the 12V electric field load calculated by the second voltage (12V) power consumption calculation unit 319 and calculate the output of the overall power consumption from the calculated power consumption of the 48V electric load and the calculated power consumption of the 12V electric field load which are received.

Further, the control unit 320 may control the output of the high voltage battery 300 to provide the output of the overall power consumption depending on the selected operation mode. For example, the control unit 320 may control the output of the high voltage battery 300 to provide the output of the overall power consumption depending on the selected operation mode. The control unit 320 controls a conducting operation or a short-circuit operation between the plurality of battery cells (not illustrated) configuring the high voltage battery 300 and thus may control the power output from the high voltage battery 300 to supply the output of the overall power consumption.

The pre-established operation mode of the control unit 320 may be previously stored in a storage medium (not illustrated) mounted in the apparatus 310 for providing a multi-voltage output of a low voltage DC-DC converter of an eco-friendly vehicle or may be previously stored in the storage medium included in the eco-friendly vehicle. For example, the control unit 320 may include at least one of ROM and RAM as the storage medium. The pre-established operation module may be previously set by at least one of the driver and manufacturers of the eco-friendly vehicle. The pre-established operation modes may be previously set in the storage medium as the following Table.

| Division | Calculated Power Consumption of 48 V Electric Field Load | Calculated Power Consumption of 12 V Electric Field Load | Calculated Output of Overall Power Consumption |
| --- | --- | --- | --- |
| First Operation mode | More than 0% to 10% or less | More than 0% to 10% or less | More than 0% to 20% or less |
| Second Operation mode | More than 0% to 10% or less | More than 10% to 90% or less | More than 10% to 100% or less |
| Third Operation mode | More than 10% to 90% or less | More than 0% to 10% or less | More than 10% to 100% or less |
| Fourth Operation mode | More than 10% to 90% or less | More than 10% to 90% or less | More than 20% to 180% or less |
| Fifth Operation mode | More than 10% to 90% or less | More than 90% to 100% or less | More than 100% to 190% or less |
| Sixth Operation mode | More than 90% to 100% or less | More than 90% to 100% or less | More than 180% to 200% or less |

The pre-established operation mode may be configured of the plurality of operation modes in consideration of the calculated power consumption of the 48V electric field load and the calculated power consumption of the 12 electric field load. For example, as shown in the above Table, the pre-established operation modes may be configured of a total of six modes, that is, a first operation mode, a second operation mode, a third operation mode, a fourth operation mode, a fifth operation mode, and a sixth operation mode.

When the range of the power consumption of the 48V electric field load calculated based on an output value (200%) of the overall maximum power consumption set based on the maximum output power of the high voltage battery 300 is more than 0% to 10% or less and the range of the calculated power consumption of the 12V electric field load is more than 0% to 10% or less, the control unit 320 may control the power output from the high voltage battery 300 in the first operation mode to correspond to the output of the calculated overall power consumption of which the range is more than 0% to 20% or less. The first operation mode performed by the control unit 320 is a mode controlling the power output from the high voltage battery 300 to supply the power corresponding to the calculated overall power consumption of which the range is more than 0% to 20% or less.

Further, when the range of the power consumption of the 48V electric field load calculated based on the output value (200%) of the overall maximum power consumption set based on the maximum output power of the high voltage battery 300 is more than 0% to 10% or less and the range of the calculated power consumption of the 12V electric field load is more than 10% to 90% or less, the control unit 320 may control the power output from the high voltage battery 300 in the second operation mode to correspond to the output of the calculated overall power consumption of which the range is more than 10% to 100% or less. The second operation mode performed by the control unit 320 is a mode controlling the power output from the high voltage battery 300 to supply the power corresponding to the calculated overall power consumption of which the range is more than 10% to 100% or less.

Further, when the range of the power consumption of the 48V electric field load calculated based on the output value (200%) of the overall maximum power consumption set based on the maximum output power of the high voltage battery 300 is more than 10% to 90% or less and the range of the calculated power consumption of the 12V electric field load is more than 0% to 10% or less, the control unit 320 may control the power output from the high voltage battery 300 in the third operation mode to correspond to the output of the calculated overall power consumption of which the range is more than 10% to 100% or less. The third operation mode performed by the control unit 320 is a mode controlling the power output from the high voltage battery 300 to supply the power corresponding to the calculated overall power consumption of which the range is more than 10% to 100% or less.

Further, when the range of the power consumption of the 48V electric field load calculated based on the output value (200%) of the overall maximum power consumption set based on the maximum output power of the high voltage battery 300 is more than 10% to 90% or less and the range of the calculated power consumption of the 12V electric field load is more than 10% to 90% or less, the control unit 320 may control the power output from the high voltage battery 300 in the fourth operation mode to correspond to the output of the calculated overall power consumption of which the range is more than 20% to 180% or less. The second operation mode performed by the control unit 320 is a mode controlling the power output from the high voltage battery 300 to supply the power corresponding to the calculated overall power consumption of which the range is more than 20% to 180% or less.

Further, when the range of the power consumption of the 48V electric field load calculated based on the output value (200%) of the overall maximum power consumption set based on the maximum output power of the high voltage battery 300 is more than 10% to 90% or less and the range of the calculated power consumption of the 12V electric field load is more than 90% to 100% or less, the control unit 320 may control the power output from the high voltage battery 300 in the fifth operation mode to correspond to the output of the calculated overall power consumption of which the range is more than 100% to 190% or less. The second operation mode performed by the control unit 320 is a mode controlling the power output from the high voltage battery 300 to supply the power corresponding to the calculated overall power consumption of which the range is more than 100% to 190% or less.

Further, when the range of the power consumption of the 48V electric field load calculated based on the output value (200%) of the overall maximum power consumption set based on the maximum output power of the high voltage battery 300 is more than 90% to 100% or less and the range of the calculated power consumption of the 12V electric field load is more than 90% to 100% or less, the control unit 320 may control the power output from the high voltage battery 300 in the sixth operation mode to correspond to the output of the calculated overall power consumption of which the range is more than 180% to 200% or less. The sixth operation mode performed by the control unit 320 is a mode controlling the power output from the high voltage battery 300 to supply the power corresponding to the calculated overall power consumption of which the range is more than 180% to 200% or less.

Further, the control unit 320 may be an electronic control device which is mounted in the apparatus 210 for providing a multi-voltage output of a low voltage DC-DC converter of an eco-friendly vehicle.

Further, the control unit 320 may be one of the electronic control devices of other systems which are included in the eco-friendly vehicle. For example, the control unit 320 may be the electronic control device of the battery management system mounted in the vehicle.

Meanwhile, each component of the apparatuses 210 and 310 for providing a multi-voltage output of a low voltage DC-DC converter of an eco-friendly vehicle are illustrated in different drawings to illustrate that they may be functionally and logically separated and does not mean that they are not physically necessarily implemented as separate components or separate codes.

Further, in the present specification, each function unit may mean hardware to perform the technical idea of the present invention and a functional and structural coupling of software to run the hardware. For example, each of the function units may mean a predetermined code and a logical unit of a hardware resource to run the predetermined code or the fact that each of the function units does not necessarily mean the physically connected code and one kind of hardware may be easily inferred by a person having ordinary skill in the art to which the present invention pertains.

Hereinafter, a method for providing a multi-voltage output of the low voltage DC-DC converter of an eco-friendly vehicle in accordance with the embodiment of the present invention.

Figure 4:
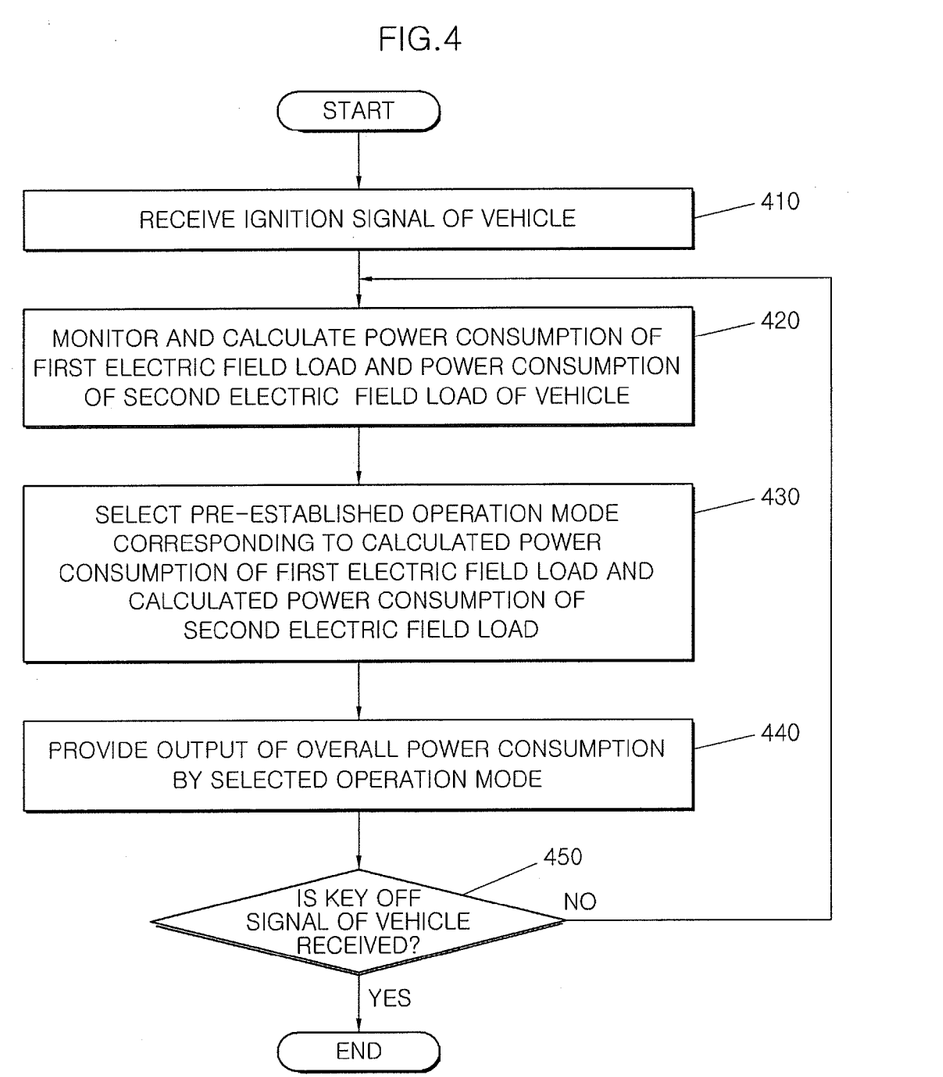
FIG. 4 is a block diagram illustrating a method for providing a multi-voltage output of a low voltage DC-DC converter of an eco-friendly vehicle in accordance with an embodiment of the present invention.

FIG. 4 is a block diagram illustrating a method for providing a multi-voltage output of a low voltage DC-DC converter of an eco-friendly vehicle in accordance with an embodiment of the present invention. Referring to FIG. 4, the control unit 320 of the apparatus 310 for providing a multi-voltage output of a low voltage DC-DC converter of an eco-friendly vehicle.

Next, the control unit 320 may monitor and calculate the power consumption of the first electric field load and the power consumption of the second electric field load of the eco-friendly vehicle (420). For example, the power consumption of the first electric field load is the power consumption of the electric field load which varies depending on the plurality of electric sub assemblies or electronic sub assemblies mounted in the eco-friendly vehicle using the 48V voltage as power. The power consumption of the second electric field load is the power consumption of the electric field load which is a sum of the power consumption of the electric field load varying depending on the plurality of electric sub assemblies or electronic sub assemblies mounted in the eco-friendly vehicle using the 12V voltage as power and the power consumption of the load varying depending on the operation state of the low voltage battery.

Next, the control unit 320 may select one operation mode, which corresponds to the calculated power consumption of the first electric field load and the calculated power consumption of the second electric field load, among the pre-established operation modes.

Next, the control unit 320 controls the output power of the high voltage battery depending on the selected operation mode to be able to provide the output of the overall power consumption (440).

Next, the control unit 320 may determine whether a key off signal of the eco-friendly vehicle is received. As the determination result, if it is determined that the key off signal is received, the control unit 320 may end the proceeding of the corresponding steps. When the key off signal is not received, the control unit 320 proceeds to the step 420 to perform the corresponding step.

Meanwhile, the method for providing a multi-voltage output of a low voltage DC converter of an eco-friendly vehicle in accordance with the embodiments of the present invention may be implemented in a program command type which may be run by various types of computer devices and thus may be recorded in a computer readable medium. The computer readable medium may include program commands, data fields, a data structure, and the like, alone or a combination thereof. The program command recorded in the computer-readable medium may be specifically designed and constituted especially for the present invention, or may be known to those skilled in a field of computer software. An example of the computer readable recording medium may include magnetic media such as hard disk, floppy disk, magnetic tape, and the like, optical media such as CD-ROM, DVD, and the like, magneto-optical media such as floptical disk, and hardware devices specially configured to store and run program commands such as ROM, RAM, flash memory, and the like. Examples of the program commands may include machine language codes such as being made by compilers as well as high-level language codes capable of being executed by computers using interpreters, or the like. The hardware device may be constituted to be operated as one more software modules in order to perform the action in accordance with the present invention, and vise versa.

In accordance with the embodiments of the present invention, the power required for each of the plurality of electric sub assemblies or electronic sub assemblies mounted in the eco-friendly vehicle may be provided based on the multi-voltage output of the apparatus for providing a multi-voltage output for the single low voltage DC-DC converter.

Further, in accordance with the embodiments of the present invention, the electric field load used as the same voltage as power in the plurality of electric sub assemblies or electronic sub assemblies mounted in the eco-friendly vehicle may be calculated and the output of the overall power consumption may be provided by selecting the operation modes corresponding to the electric field loads of each of the calculated voltages.

In addition, in accordance with the embodiments of the present invention, to provide the output of the overall power consumption, the output of power input from the high voltage battery to the AC voltage converting unit may be controlled depending on the operation mode.

Further, in accordance with the embodiments of the present invention, as compared with the space of the vehicle in which the plurality of low voltage DC-DC converters are mounted as in the related art, since the single lower voltage DC-DC converter is mounted in the vehicle, the extra space within the vehicle may be secured.

Further, in accordance with the embodiments of the present invention, the costs consumed to mount the plurality of low voltage DC-DC converter and the production costs of the vehicle than the related art may be saved.

Further, in accordance with the embodiments of the present invention, the time and manpower consumed to maintain and repair the low voltage DC-DC converter mounted in the vehicle may be saved.

While the present invention has been described with respect to the specific embodiments, it will be apparent to those skilled in the art that various changes and modifications may be made without departing from the spirit and scope of the invention as defined in the following claims.

What is claimed is:

1. A power supply apparatus of an eco-friendly vehicle, comprising:
   a battery;
   a first power converter unit comprising a DC-AC converter, a transformer and an AC-DC converter, and configured to convert DC power of the battery into DC power of a first voltage which is different from the voltage of the DC power of the battery, and further configured to supply the DC power of the first voltage to a first electric load of the vehicle;
   a second power converter unit configured to convert the DC power of the first voltage into DC power of a second voltage different from the first voltage and configured to supply the DC power of the second voltage to a second electric load of the vehicle;
   a first power consumption calculation unit configured to calculate power consumption varying depending on an operational state of the first electric load using the first voltage;
   a second power consumption calculation unit configured to calculate power consumption varying depending on an operational state of the second electric load using the second voltage; and
   a control unit configured to, after receiving an ignition signal of the eco-friendly vehicle, select one of a plurality of operation modes in response to the calculated power consumption of the first electric load and the calculated power consumption of the second electric load, and control the output of the battery to provide the output of the overall power consumption depending on the selected operation mode.

2. The apparatus of claim 1, wherein the eco-friendly vehicle is at least one of a hybrid electric vehicle, a fuel cell electric vehicle, and an electric vehicle.

3. The apparatus of claim 1, wherein the first voltage has a voltage value of 48V.

4. The apparatus of claim 1, wherein the second voltage has a voltage value of 12V.

5. The apparatus of claim 1, wherein the second power converter unit comprises a non-insulated and voltage reduced type converter.

6. The apparatus of claim 1, wherein the output of the overall power consumption is determined as a value which is a sum of the calculated power consumption of the first electric load and the calculated power consumption of the second electric load.

7. The apparatus of claim 1, wherein the first power consumption calculation unit divides a range into three stage ranges within a range of more than 0% to 100% or less to calculate the power consumption of the first electric load.

8. The apparatus of claim 1, wherein the second power consumption calculation unit divides a range into three stage ranges within a range of more than 0% to 100% or less to calculate the power consumption of the second electric load.

9. The apparatus of claim 1, wherein the control unit divides a range into six stage ranges within a range of more than 0% to 200% or less to calculate the output of the overall power consumption.

10. The apparatus of claim 1, further comprising: an LC filter unit configured to remove a ripple of the DC power of the first voltage by an operation of an LC filter and convert the DC power of the first voltage into DC power of the first voltage in a smooth state.

11. The apparatus of claim 1, wherein the DC-AC converter is configured to convert DC power of the battery into AC power using a full bridge type of pulse width modulation.

12. The apparatus of claim 1, wherein the AC-DC converter comprises a plurality of rectifying diodes.

13. The apparatus of claim 1, wherein the DC power of the first voltage is supplied to propel the vehicle.

14. A method for providing a multi-voltage output of a low voltage DC-DC converter of an eco-friendly vehicle, comprising:

providing the power supply apparatus of claim 1;

receiving the ignition signal of the eco-friendly vehicle;

supplying the first voltage to the first electric load and supplying the second voltage to the second electric load;

monitoring and calculating power consumption of the first electric load and power consumption of the second electric load;

selecting operation modes corresponding to the calculated power consumption of the first electric load and the calculated power consumption of the second electric load among pre-established operation modes controlling an output of a high voltage battery mounted in the eco-friendly vehicle; and controlling the output of the high voltage battery depending on the selected operation mode to provide the output of the overall power consumption.

15. The method of claim 14, wherein the eco-friendly vehicle is at least one of a hybrid electric vehicle, a fuel cell electric vehicle, and an electric vehicle.

16. The method of claim 14, wherein the first voltage has a voltage value of 48V.

17. The method of claim 14, wherein the second voltage has a voltage value of 12V.

* * * * *